(12) United States Patent
Kodama et al.

(10) Patent No.: US 9,019,656 B2
(45) Date of Patent: Apr. 28, 2015

(54) DISK DRIVE UNIT HAVING GAS-LIQUID INTERFACE BETWEEN FIXED BODY AND ROTOR

(71) Applicant: Samsung Electro-Mechanics Japan Advanced Technology Co., Ltd., Shizuoka (JP)

(72) Inventors: Mitsuo Kodama, Shizuoka (JP); Ryusuke Sugiki, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 14/196,036

(22) Filed: Mar. 4, 2014

(65) Prior Publication Data

US 2014/0254046 A1 Sep. 11, 2014

(30) Foreign Application Priority Data

Mar. 8, 2013 (JP) ................................. 2013-046292

(51) Int. Cl.
*G11B 19/20* (2006.01)
*F16C 32/06* (2006.01)
*H02K 7/08* (2006.01)
*F16C 33/74* (2006.01)

(52) U.S. Cl.
CPC ............ *G11B 19/2036* (2013.01); *H02K 7/086* (2013.01); *F16C 33/745* (2013.01)

(58) Field of Classification Search
CPC .. F16C 2370/12; F16C 17/107; F16C 33/745; F16C 33/107; F16C 33/1085; F16C 33/74; G11B 19/2036; G11B 19/2009; H02K 5/1677; H02K 7/086; H02K 5/1675; H02K 7/085
USPC ......... 360/98.07, 99.08, 99.04; 310/67 R, 90; 384/100, 107
See application file for complete search history.

(56) References Cited

U.S. PATENT DOCUMENTS

| | | | | |
|---|---|---|---|---|
| 5,061,868 | A | * | 10/1991 | Iwazaki et al. ............... 310/67 R |
| 5,227,686 | A | * | 7/1993 | Ogawa ............................. 310/90 |
| 5,305,163 | A | * | 4/1994 | Holm .......................... 360/98.01 |
| 5,347,189 | A | * | 9/1994 | Chuta et al. ...................... 310/90 |
| 5,402,023 | A | * | 3/1995 | Nakanishi et al. .............. 310/90 |
| 5,430,589 | A | * | 7/1995 | Moir et al. .................... 360/97.2 |
| 5,729,403 | A | * | 3/1998 | Schuh ......................... 360/97.16 |
| 5,841,607 | A | * | 11/1998 | Khan et al. ................. 360/99.08 |
| 5,880,545 | A | * | 3/1999 | Takemura et al. .............. 310/90 |
| 6,219,199 | B1 | * | 4/2001 | Sakuragi et al. ........... 360/99.08 |

(Continued)

FOREIGN PATENT DOCUMENTS

| | | |
|---|---|---|
| JP | 2012-087867 | 5/2012 |
| JP | 2012-089200 | 5/2012 |

(Continued)

*Primary Examiner* — Brian Miller
(74) *Attorney, Agent, or Firm* — IPUSA, PLLC

(57) ABSTRACT

A disk drive unit includes a rotor configured to rotate a disk accommodated within a disk accommodating space and set thereon, a fixed body configured to rotatably support the rotor, a fluid dynamic pressure generating part provided between the fixed body and the rotor, and a plurality of ring-shaped members, provided in an overlapping manner along a direction of a rotational axis of the rotor within a space that communicates the disk accommodating space and a gas-liquid interface of the lubricant, and covering a gap between the rotor and the fixed body.

20 Claims, 5 Drawing Sheets

(56) References Cited

U.S. PATENT DOCUMENTS

| | | | |
|---|---|---|---|
| 6,339,515 B2* | 1/2002 | Lee et al. | 360/99.08 |
| 6,404,586 B2* | 6/2002 | Sakuragi et al. | 360/99.08 |
| 6,421,201 B1* | 7/2002 | Khan et al. | 360/97.15 |
| 6,512,654 B2* | 1/2003 | Teshima | 360/99.08 |
| 6,538,354 B2* | 3/2003 | Obara | 310/90 |
| 7,564,155 B2* | 7/2009 | Chiyoda et al. | 310/90 |
| 8,542,459 B2* | 9/2013 | Mizukami et al. | 360/99.08 |
| 8,593,758 B2* | 11/2013 | Yamamoto et al. | 360/99.08 |
| 8,724,257 B2* | 5/2014 | Sekii et al. | 360/99.08 |
| 8,780,494 B1* | 7/2014 | Kodama et al. | 360/99.08 |
| 8,786,982 B1* | 7/2014 | Kodama et al. | 360/99.08 |
| 2004/0165797 A1* | 8/2004 | Oku et al. | 384/119 |
| 2009/0092346 A1* | 4/2009 | Shida | 384/112 |
| 2009/0140587 A1 | 6/2009 | Popov et al. | |
| 2010/0277833 A1 | 11/2010 | Sugiki | |
| 2010/0315742 A1 | 12/2010 | Kimura et al. | |
| 2010/0321823 A1 | 12/2010 | Oe et al. | |
| 2011/0279925 A1* | 11/2011 | Watanabe et al. | 360/99.08 |
| 2012/0090163 A1 | 4/2012 | Kodama et al. | |
| 2012/0093446 A1 | 4/2012 | Goto et al. | |
| 2012/0183243 A1 | 7/2012 | Sugiki | |
| 2012/0326543 A1* | 12/2012 | Kimura et al. | 310/90 |
| 2013/0163120 A1 | 6/2013 | Kodama et al. | |
| 2013/0216166 A1 | 8/2013 | Kodama et al. | |
| 2013/0234552 A1* | 9/2013 | Kodama et al. | 310/90 |
| 2013/0235489 A1 | 9/2013 | Aoshima | |
| 2013/0279043 A1 | 10/2013 | Kodama et al. | |
| 2013/0322793 A1 | 12/2013 | Kodama et al. | |

FOREIGN PATENT DOCUMENTS

| | | |
|---|---|---|
| JP | 2012-163203 | 8/2012 |
| JP | 2012-165627 | 8/2012 |

* cited by examiner

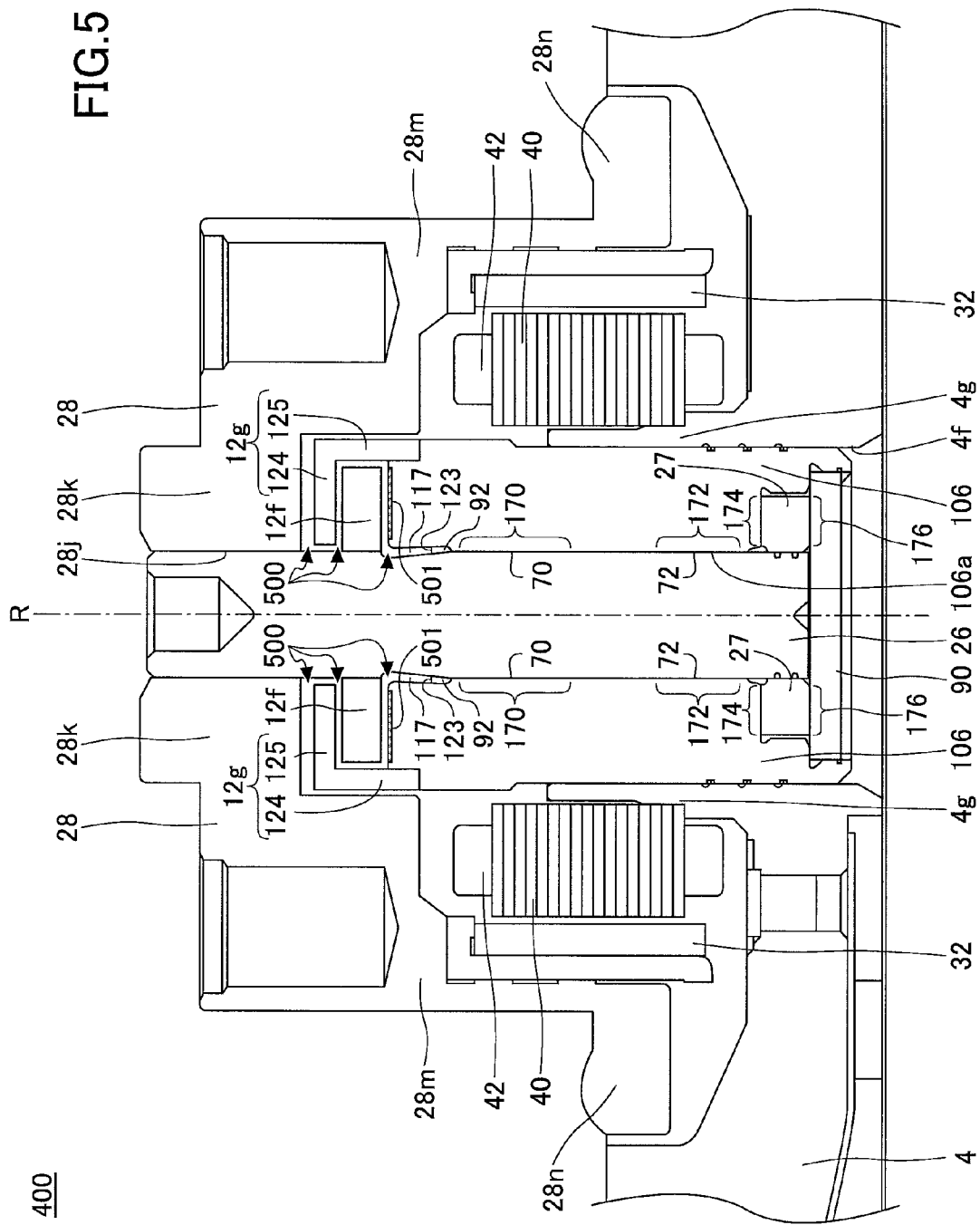

DISK DRIVE UNIT HAVING GAS-LIQUID INTERFACE BETWEEN FIXED BODY AND ROTOR

CROSS-REFERENCE TO RELATED APPLICATIONS

This application is based upon and claims the benefit of priority of Japanese Patent Application No. 2013-046292 filed on Mar. 8, 2013, the entire contents of which are incorporated herein by reference.

BACKGROUND OF THE INVENTION

1. Field of the Invention

The present invention relates to a disk drive unit.

2. Description of the Related Art

A disk drive unit, such as a HDD (Hard Disk Drive), for example, is one type of a rotating device. The disk drive unit may use a fluid dynamic bearing that rotatably supports a disk by providing a lubricant between a rotating body and a fixed body. In the disk drive unit mounted with the fluid dynamic bearing, it may be important, from the standpoint of enabling the use of the disk drive unit for a long time without an operation error, to manage an existing state of the lubricant, such as the amount of lubricant and an interface position of the lubricant, and to prevent scattering and leaking of the lubricant.

In order to accurately and easily confirm the interface position of the lubricant, a fluid dynamic bearing mechanism having a seal member formed by a translucent material has been proposed in Japanese Laid-Open Patent Publication No. 2012-089200, for example. Further, in order to prevent leaking of the lubricant, a fluid dynamic bearing unit having a bearing member formed with a ring-shaped groove to hold the lubricant that is provided to a predetermined lubricant level has been proposed in Japanese Laid-Open Patent Publication No. 2012-087867, for example.

In addition, in order to prevent the scattering and leaking of the lubricant, a disk drive unit having a cap member that covers a gas-liquid interface of a capillary seal part has been proposed in Japanese Laid-Open Patent Publications No. 2012-089200, No. 2012-087867, No. 2012-163203, and No. 2012-165627, for example.

However, in the disk drive unit having the fluid dynamic bearing, the lubricant may vaporize from the gas-liquid interface and adhere on the disk surface through a gap or the like, and an operation error may occur during a read or a write with respect to the disk. Such disk contamination caused by the vaporized lubricant adhering onto the disk surface may also occur in the configurations proposed in the Japanese Laid-Open Patent Publications No. 2012-089200, No. 2012-087867, No. 2012-163203, and No. 2012-165627 described above, for example, and cause the operation error of the disk drive unit. Particularly as the storage capacity of the disk drive unit becomes larger, it becomes more and more desirable to suppress adhesion of the lubricant onto the disk surface.

SUMMARY OF THE INVENTION

Embodiments of the present invention may provide a disk drive unit that prevents adhesion of the lubricant onto the disk surface, and reduces generation of the operation error.

According to one aspect of the present invention, a disk drive unit may include a rotor configured to rotate a disk accommodated within a disk accommodating space and set thereon, a fixed body configured to rotatably support the rotor, a fluid dynamic pressure generating part provided between the fixed body and the rotor, and a plurality of ring-shaped members, provided in an overlapping manner along a direction of a rotational axis of the rotor within a space that communicates the disk accommodating space and a gas-liquid interface of the lubricant, and covering a gap between the rotor and the fixed body.

Other objects and further features of the present invention may be apparent from the following detailed description when read in conjunction with the accompanying drawings.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a cross sectional view illustrating the configuration of one part of the disk drive unit in a fourth embodiment.

DESCRIPTION OF THE PREFERRED EMBODIMENTS

Figure 1A:
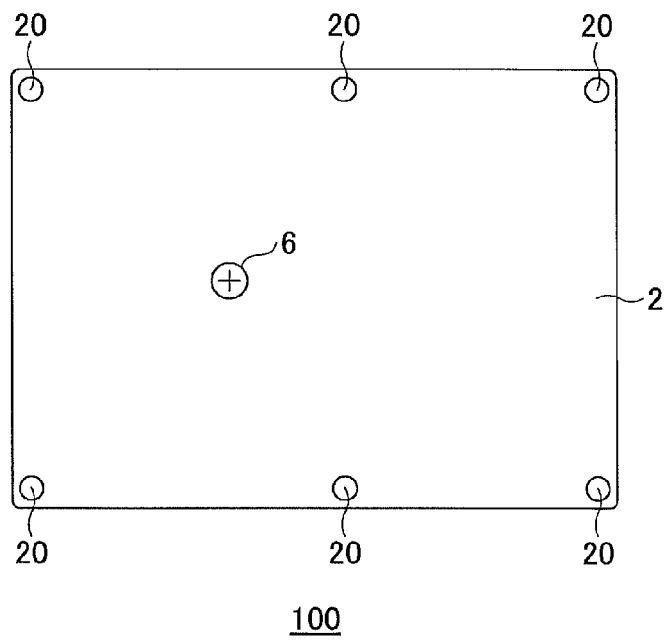
FIGS. 1A, 1B, and 1C are diagrams for explaining an example of a configuration of a disk drive unit in a first embodiment.

In each of the figures described hereunder, those elements and parts that are the same or substantially the same are designated by the same reference numerals, and a description thereof will not be repeated where appropriate. In addition, dimensions of the parts in each of the figures are enlarged or reduced, where appropriate, in order to facilitate understanding of the parts. Further, in each of the figures, illustration of some of the parts that may be considered unimportant in describing embodiments is omitted for the *sake* of convenience.

First Embodiment

A description will be given of a disk drive unit 100, which is one type of a rotating device, in a first embodiment of the present invention. In the disk drive unit 100, a lubricant is provided between a fixed body and a rotating body, and a plurality of ring-shaped members suppress scattering of the lubricant.

<Configuration of Disk Drive Unit>

Figure 1B:
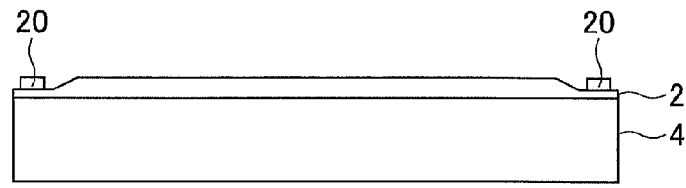
Figure 1C:
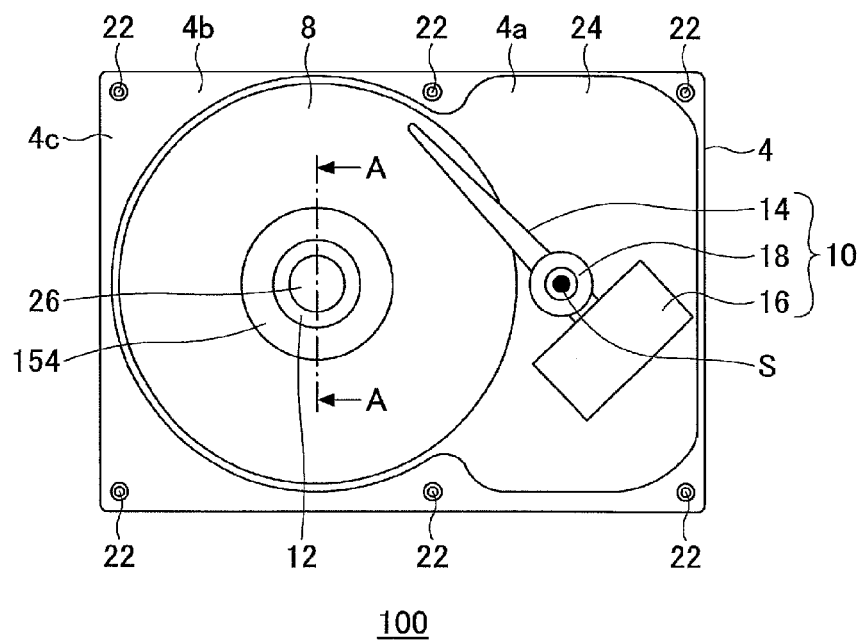

A description will be given of a configuration of the disk drive unit 100, by referring to FIGS. 1A, 1B, and 1C. FIGS. 1A, 1B, and 1C illustrate the disk drive unit 100 in the first embodiment. FIG. 1A illustrates a top view (or plan view) of the disk drive unit 100, FIG. 1B illustrates a side view of the disk drive unit 100, and FIG. 1C illustrates a top view of the disk drive unit 100 in a state in which a top cover 2 is removed.

The disk drive unit 100 may include the top cover 2 and a base 4. A magnetic recording disk 8 and a data read and write part 10 may be provided in a space between the top cover 2 and the base 4.

In the following description, an end (or side) of the top cover 2 may also be referred to as an upper end (or upper side), and an end (or side) of the base 4 may also be referred to as a lower end (or lower side) of the disk drive unit 100.

(Base)

As illustrated in FIG. 1C, the base 4 may include a bottom plate part 4a that forms a bottom part of the disk drive unit 100, and an outer peripheral wall part 4b that is formed along an outer periphery of the bottom plate part 4a so as to surround a mounting region in which a magnetic recording disk 8 is to be mounted. An upper surface 4c of the outer peripheral wall part 4b includes six (6) screw holes 22 that are used to mount the top cover 2.

The base 4 in the first embodiment may be formed by die casting an aluminum alloy. For example, the base 4 may be formed by pressing a metal plate, such as an aluminum plate, a steel plate, and the like. In this latter case, an embossing may be performed in order to form projections on the upper side of the base 4. By performing the embossing at predetermined parts of the base 4, deformation of the base 4 may be suppressed. In addition, when forming the base 4 by the pressing, a surface treatment, such as plating, resin coating, and the like may be performed on the base 4. For example, after forming the base 4 by pressing the metal plate, a nickel plated layer and an epoxy resin surface layer may be provided on the base 4.

In addition, the base 4 may be formed by a combination of a metal plate part that is formed by pressing the metal plate, such as the aluminum plate, the steel plate, and the like, and a die cast part that is formed by aluminum die casting. For example, the bottom plate part 4a may be formed to include the metal plate part, and the outer peripheral wall part 4b may be formed to include the die cast part. By employing this combination configuration, rigidity deterioration of the screw holes 22 may be suppressed. In this case, the die cast part may be formed by the aluminum die casting in a state in which the preformed metal plate part is set in a die that is used for the aluminum die casting. According to this method of fabricating the base 4, a process to connect the metal plate part and the die cast part may be omitted, and a dimension accuracy of the metal plate part and the die cast part may be improved. Further, a separate part or member used to connect the metal plate member and the die cast part may be reduced or eliminated, and as a result, the base 4 may be made thin.

(Top Cover)

As illustrated in FIGS. 1A and 1B, the top cover 2 may be fixed to the upper surface 4c of the outer peripheral wall part 4b of the base 4, by screwing six (6) screws into the screw holes 22 that are provided in the upper surface 4c of the base 4. In addition, a shaft (or shaft body) 26 may be fixed to a lower surface of the base 4 by a shaft securing screw 6.

(Disk Accommodating Space)

A disk accommodating space 24 may be formed between the top cover 2 and the base 4. The disk accommodating space 24 may accommodate the magnetic recording disk 8. The disk accommodating space 24 may be filled with clean air removed of dust, in order to prevent contaminating particles from adhering onto the surface of the magnetic recording disk 8 and to improve the reliability of the operation of the disk drive unit 100. Accordingly, the top cover 2 and the base 4 are provided to seal the disk accommodating space 24 so that the dust does not enter the disk accommodating space 24 from the atmosphere.

(Magnetic Recording Disk)

The magnetic recording disk 8 may be set on a hub (not illustrated) that surrounds the shaft 26, and rotate together with the hub. For example, the magnetic recording disk 8 may be formed by a 2.5-inch type magnetic recording disk made of glass and having a diameter of 65 mm, a thickness of 0.65 mm, and a center hole with a diameter of 20 mm. In this example, three (3) magnetic recording disks 8 may be accommodated within the disk drive unit 100.

The magnetic recording disk 8 may be pushed by a clamper 154 against the hub together with a spacer (not illustrated), and fixed to the hub. Hence, the magnetic recording disk 8 may rotated together with the hub about the shaft 26 as its center of rotation. A cap 12 may suppress the lubricant that is provided between the shaft 26 and a sleeve (not illustrated) that surrounds the shaft 26 from scattering into the disk accommodating space 24.

(Data Read and Write Part)

The data read and write part 10 may include a recording and reproducing head (not illustrated), a swing arm 14, a voice coil motor 16, and a pivot assembly 18, as illustrated in FIG. 10.

The recording and reproducing head may be mounted on a tip end of the swing arm 14, and record (or write) data to the magnetic recording disk 8 and reproduce (or read) data from the magnetic recording disk 8.

The pivot assembly 18 pivotally supports the swing arm 14 with respect to the base 4 about a head rotational axis S as its center of pivoting.

The voice coil motor 16 swings the swing arm 14 about the head rotational axis S as its center of swing, and moves the recording and reproducing head to a desired position on an upper surface of the magnetic recording disk 8. The voice coil motor 16 and the pivot assembly 18 may be formed using a known technique to control the head position.

<Configuration of Bearing Mechanism>

Figure 2:
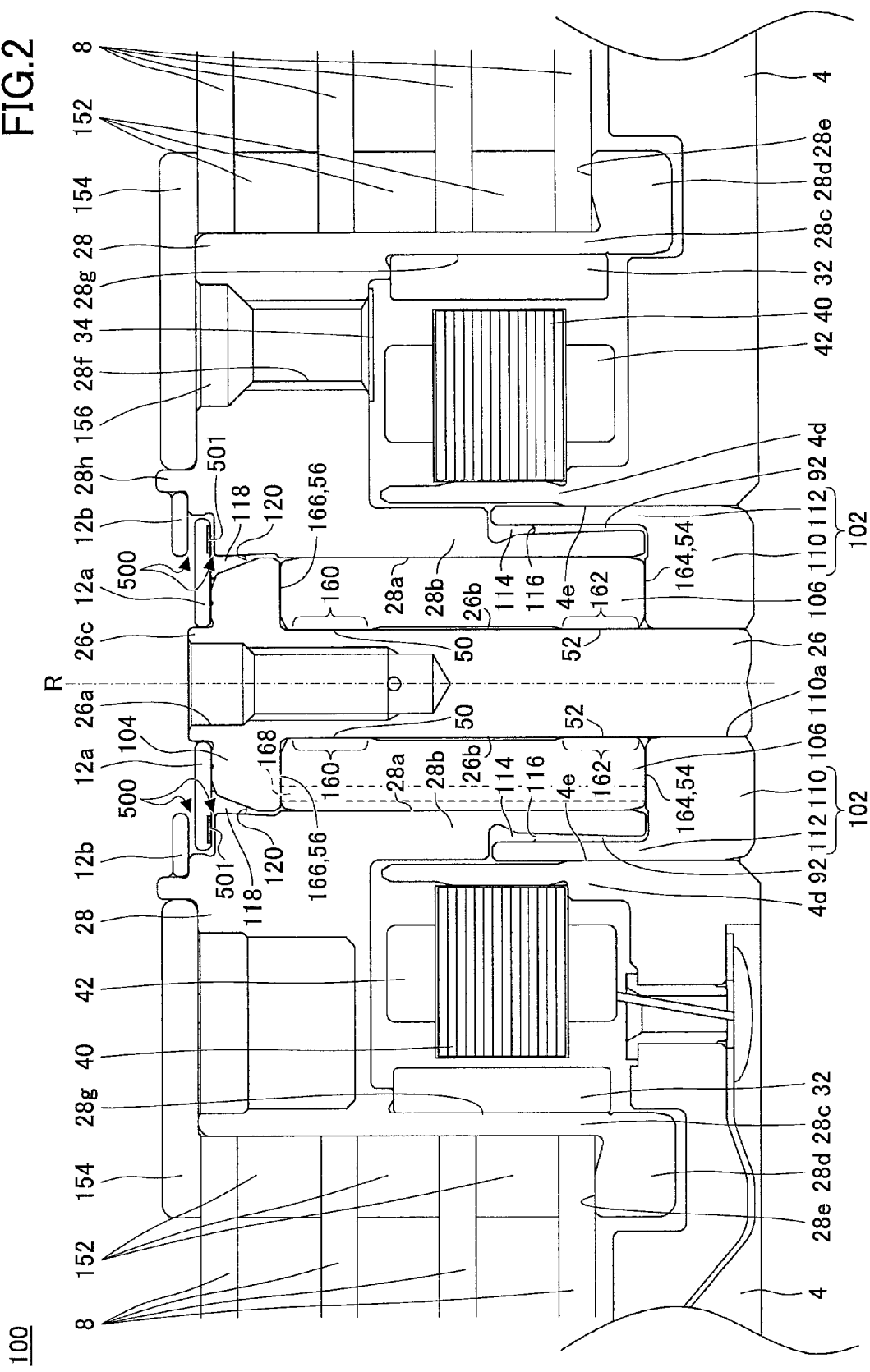
FIG. 2 is a cross sectional view illustrating the configuration of one part of the disk drive unit in the first embodiment.

A description will be given of a bearing mechanism of the disk drive unit 100, by referring to FIG. 2. FIG. 2 illustrates a cross sectional view of the disk drive unit 100 along a line A-A in FIG. 10. In the following description, a direction perpendicular to a rotational axis R may also be referred to as a radial direction, an end (or side) further away from the rotational axis R along a radial direction of the magnetic recording disk 8 may also be referred to as an outer peripheral side, and an end (or side) closer to the rotational axis R along the radial direction may also be referred to as an inner peripheral side.

The disk drive unit 100 may include a rotor that is set with the magnetic recording disk 8 and rotates, a bearing unit that rotatably supports the rotor, and a fixed body that supports the bearing unit.

The rotor may include a hub 28, a cylindrical magnet 32, a sleeve 106, and the clamper 154. The fixed body may include the base 4, the shaft 26, a laminated (or stacked) core 40, a coil 42, and a housing 102. The sleeve 106 surrounds the shaft 26, and rotates together with the hub 28 by being supported by the shaft 26 and the housing 102. A lubricant 92 may be provided in a gap between the shaft 26 and the sleeve 106. In addition, a fluid dynamic pressure generating part, that generates a fluid dynamic pressure in the lubricant 92, is provided between the shaft 26 and the sleeve 106.

(Hub)

The hub 28 may include a center hole 28a that is formed along the rotational axis R, and may be fixed to an outer peripheral side of the sleeve 106 that is inserted into the center hole 28a. In addition, the hub 28 may include a sleeve surrounding part 28b that surrounds the sleeve 106, a hub projecting part 28c that fits into the center hole of the magnetic recording disk 8, a disk setting part 28d provided on the outer peripheral side of the hub projecting part 28c, and a disk setting surface 28e on which the magnetic recording disk 8 may be set.

Four (4) stacked magnetic recording disks 8 having a ring-shaped spacer 152 interposed between each of two (2) mutually adjacent magnetic recording disks 8 are set on the disk setting surface 28e of the disk setting part 28d at the hub projecting part 28c. The magnetic recording disks 8 are fixed to the hub projecting part 28c of the hub 28 together with the spacers 152, by being sandwiched between the clamper 154 and the disk setting part 28d, and rotate together with the hub 28.

The hub 28 may be formed from a soft magnetic steel material such as SUS430F or aluminum, for example. The hub 28 may be formed by pressing or cutting the steel or aluminum material, and may be formed to an approximate cup shape having the center hole 28a.

The steel material preferably used for the hub 28 may be stainless steel DHS1 supplied by Daido Steel Co., Ltd., for example, which is low in outgas and easy to press and cut. In addition, the steel material used for the hub 28 may be stainless steel DHS2 supplied by Daido Steel Co., Ltd., for example, which may further be preferable due to its anti-corrosion characteristic. A surface treatment, such as plating, resin coating, and the like may be performed on the hub 28. The hub 28 in the first embodiment may include a surface layer formed by electroless nickel plating, in order to suppress peeling of micro residue adhered on the processed surface.

(Clamper)

The clamper 154 may be fixed to an upper surface of the hub 28 by a plurality of clamps screws 156. The clamp screws 156 are screwed into clamp screw holes 28f provided in the hub 28, in order to fix the clamper 154 to the hub 28. The clamp screw holes 28f penetrate the hub 28, and a lower end of the clamp screw holes 28f may be closed by a closing means 34 such as a tape, for example. Because the clamp screw holes 28f have a shape penetrating the hub 28, the clamp screw holes 28f may be formed with ease. In addition, because the closing means 34 may close the clamp screw holes 28f, upward scattering of the lubricant 92 through the clamp screw holes 28f may be prevented.

(Cylindrical Magnet)

The cylindrical magnet 32 may be bonded and fixed to a cylindrical inner peripheral surface 28g on the inner peripheral side of the projecting part 28c of the hub 28. The cylindrical magnet 32 may be formed from a rare earth magnetic material, a ferrite magnetic material, or the like, for example. The cylindrical magnet 32 in the first embodiment may be formed from a neodymium rare earth magnetic material.

The cylindrical magnet 32 may be magnetized to have sixteen (16) poles, for example, along a circumferential direction of a circle about the rotational axis R as its center in a cross section perpendicular to the rotational axis R. A surface layer may be formed on the surface of the cylindrical magnet 32 by electro-coating, spray coating, or the like, for example, in order to suppress corrosion. The cylindrical magnet 32 may oppose twelve (12) salient poles of the laminated core 40 in a radial direction.

(Laminated Core)

The laminated core 40 may include a cylindrical part and the twelve (12) salient poles extending from the cylindrical part towards the outer peripheral side. The laminated core 40 may be formed by laminating fourteen (14) thin magnetic steel plates, and crimping or caulking the thin magnetic steel plates in order to integrally form the laminated core 40. An insulator coating may be formed on the surface of the laminated core 40 by electro-coating, powder coating, or the like, for example. The coil 42 may be wound on each salient pole of the laminated core 40. A driving magnetic flux is generated along the salient poles when a 3-phase driving current having an approximately sinusoidal waveform flows to the coil 42.

A cylindrical base projecting part 4d having the rotational axis R as its center may be provided on the base 4. The base projecting part 4d may surround the housing 102 and project upwards from the lower surface of the base 4. The laminated core 40 may be fitted to the outer peripheral surface of the base projecting part 4d, so that the outer peripheral surface of the base projecting part 4d fits into a center hole in the cylindrical part of the laminated core 40. The cylindrical part of the laminated core 40 may be press fit, or bonded, or press fit and bonded to the base projecting part 4d.

The core is not limited to the laminated core 40, and for example, a solid core may be used in place of the laminated core 40. In addition, although the disk drive unit 100 in the first embodiment is the so-called outer rotor type in which the cylindrical magnet 32 is located on the outer side of the laminated core 40, the disk drive unit 100 may be the so-called inner rotor type in which the cylindrical magnet 32 is located on the inner side of the laminated core 40.

(Housing)

The housing 102 may include a flat ring-shaped shaft holding part 110, and a cylindrical part 112 that projects upwardly from the outer peripheral side of the shaft holding part 110. The cylindrical part 112 may surround the sleeve 106 and the sleeve surrounding part 28b of the hub 28 on the side end part of the base 4. The lubricant 92 may be provided in a gap between the cylindrical part 112 of the housing 102 and the sleeve surrounding part 28b of the hub 28.

The housing 102 may be formed by connecting the shaft holding part 110 and the cylindrical part 112 that are formed as separate parts. By forming the housing 102 as separate parts, each of the shaft holding part 110 and the cylindrical part 112 may be formed with ease. On the other hand, when the shaft holding part 110 and the cylindrical part 112 are formed integrally as in the first embodiment, fabrication error may be reduced and a bonding process may be simplified.

The housing 102 may be fixed to the base 40 by press fitting, or bonding, or press fitting and bonding the cylindrical part 112 into a center hole 4e that is provided on the inner peripheral side of the base projecting part 4d and has the rotational axis R as its center. The shaft holding part 110 of the housing 102 may include a shaft hole 110a having the rotational axis R as its center, and the shaft 26 may be press fit, or bonded, or press fit and bonded into the shaft hole 110a in order to fix and hold the shaft 26.

The housing 102 may be formed from a copper alloy, a sintered alloy made by powder metallurgy, stainless steel, plastic materials such as polyetherimide, polyimide, and polyamide, and the like, for example. In a case in which the plastic material is used for the housing 102, carbon fiber may be included in the plastic material to make the resistivity $10^6$ ($\Omega \cdot m$) or less, in order to secure an electrostatic eliminating function of the disk drive unit 100.

(Shaft)

The shaft 26 may include a securing screw hole 26a at an upper surface thereof. An upper end of the shaft 26 may be fixed to the cover 2 by screwing the shaft securing screw 6 into the securing screw hole 26a by penetrating the top cover 2. In addition, a lower end of the shaft 26 may be press fit, or bonded, or press fit and bonded into the shaft hole 110a of the housing 102 and fixed to the housing 102. The disk drive unit 100 may have a superior shock resistance and vibration resistance due to the structure in which both ends of the shaft 26 are fixed to and supported by the base 4 via the top cover 2 and the housing 102, respectively.

A flange surrounding part 104 may be provided at the upper end side of the shaft 26. The flange surrounding part 104 may be formed as a separate part from the shaft 26. The flange surrounding part 104 and the shaft 26 may be formed with ease by forming the flange surrounding part 104 and the shaft 26 as separate parts. In the first embodiment, the shaft 26 and the flange surrounding part 104 may be formed integrally. When the shaft 26 and the flange surrounding part 104 are formed integrally as in the first embodiment, the strength and the dimension accuracy of the flange surrounding part 104 may be improved. The shaft 26 may be formed by cutting stainless steel such as SUS420J2 or the like, for example.

(Sleeve)

The sleeve 106 may surround the shaft 26, and may be sandwiched between the flange surrounding part 104 of the shaft 26 and the shaft holding part 110 of the housing 102 in the axial direction. The sleeve 106 and the hub 28 may be formed integrally. The sleeve 106 may be formed in to a desired shape by cutting a base material made of brass, aluminum, stainless steel DHS1, or the like, for example, into a desired shape, and subjecting the desired shape to a nickel plating, for example.

The sleeve 106 may surround a part from an upper portion of the part of the shaft 26 held by the shaft holding part 110 of the housing 102 up to the flange surrounding part 104. The lubricant 92 may be provided in the gap between the sleeve 106 and the shaft 26.

(Dynamic Pressure Generator)

A first gap may be formed between an outer peripheral surface 26b of the shaft 26 and the inner peripheral surface of the sleeve 106. The lubricant 92 may be provided in this first gap.

In the first gap, a first radial dynamic pressure generator 160 may be formed at a lower portion of the flange surrounding part 104 of the shaft 26, and a second radial dynamic pressure generator 162 may be formed at an upper portion of the shaft holding part 110 of the housing 102. The first radial dynamic pressure generator 160 and the second radial dynamic pressure generator 162 may be formed at positions separated along the direction of the axial direction (or rotational axis R).

The sleeve 106 may include a first radial dynamic pressure generating groove 50 having a herringbone shape or a spiral shape, for example, at a portion opposing the first radial dynamic pressure generator 160. In addition, the sleeve 106 may include a second radial dynamic pressure generating groove 52 having a herringbone shape or the spiral shape, for example, at a portion opposing the second radial dynamic pressure generator 162.

One of or both the first radial dynamic pressure generating groove 50 and the second radial dynamic pressure generating groove 52 may be formed on the outer peripheral surface 26b of the shaft 26. The first radial dynamic pressure generating groove 50 and the second radial dynamic pressure generating groove 52 may be formed by rolling, cutting, electrolytic etching, and the like, for example.

A second gap may be formed between a lower surface of the sleeve 106 and an upper surface of the shaft holding part 110 of the housing 102. The lubricant 92 may be provided in this second gap, in a manner similar to the first gap.

In the second gap, a first thrust dynamic pressure generator 164, that generates a dynamic pressure in the lubricant 92 along the direction of the rotational axis, may be formed when the hub 28 including the sleeve 106 rotates. The sleeve 106 may include a first thrust dynamic pressure generating groove 54 having a herringbone shape or a spiral shape, for example, in a lower surface opposing the first thrust dynamic pressure generator 164. The first thrust dynamic pressure generating groove 54 may be formed in the upper surface of the shaft holding part 110, instead of being formed in the lower surface of the sleeve 106.

A third gap may be formed between the upper surface of the sleeve 106 and a lower surface of the flange surrounding part 104 of the shaft 26. The lubricant 92 may be provided in this third gap, in a manner similar to the first and second gaps.

In the third gap, a second thrust dynamic pressure generator 166, that generates a dynamic pressure in the lubricant 92 along the direction of the rotational axis, may be formed when the hub 28 including the sleeve 106 rotates. The sleeve 106 may include a second thrust dynamic pressure generating groove 56 having a herringbone shape or a spiral shape, for example, in an upper surface opposing the second thrust dynamic pressure generator 166. The second thrust dynamic pressure generating groove 56 may be formed in the lower surface of the flange surrounding part 104, instead of being formed in the upper surface of the sleeve 106. The first thrust dynamic pressure generating groove 54 and the second thrust dynamic pressure generating groove 56 may be formed by rolling, cutting, electrolytic etching, and the like, for example.

When the hub 28 including the sleeve 106 rotates with respect to the shaft 26, the dynamic pressure may be generated in the lubricant 92 at each of the first radial dynamic pressure generator 160, the second radial dynamic pressure generator 162, the first thrust dynamic pressure generator 164, and the second thrust dynamic pressure generator 166. The sleeve 106 may be supported along the radial direction and the direction of the rotational axis by the dynamic pressure generated in the lubricant 92, in a non-contact state in which no contact is made with the shaft 26 and the housing 102.

A bypass communication hole 168 may be provided in the sleeve 106 in order to bypass the first thrust dynamic pressure generator 164 and the second thrust dynamic pressure generator 166. By providing the bypass communication hole 168, the pressure difference amongst the regions in which the lubricant 92 is provided can be reduced, and the behavior of the lubricant 92 can be stabilized.

(Gas-Liquid Interface)

A first gas-liquid interface 116 of the lubricant 92 may be formed between the outer peripheral surface of the sleeve surrounding part 28b of the hub 28 and the inner peripheral surface of the cylindrical part 112 of the housing 102. A first tapered seal 114, that has an interval gradually spreading in an upward direction, may be formed between the outer peripheral surface of the sleeve surrounding part 28b and the inner peripheral surface of the cylindrical part 112.

In addition, a second gas-liquid interface 120 of the lubricant 92 may be formed between an outer peripheral surface of the flange surrounding part 104 of the sleeve 106 and an inner peripheral surface of the hub 28 opposing the flange surrounding part 104. A second tapered seal 118, that has an interval gradually spreading in the upward direction, may be formed between the outer peripheral surface of the flange surrounding part 104 and the inner peripheral surface of the hub 28.

(Cap)

Caps 12a and 12b formed by ring-shaped members that cover the gap between the hub 28 and the shaft 26 may be provided in a space extending from the second gas-liquid interface 120 of the lubricant 92 and connecting to the disk accommodating space 24 that accommodates the magnetic recording disks 8. The caps 12a and 12b formed by the ring-shaped members are provided in an overlapping manner along the direction of the rotational axis of the hub 28 and the sleeve 106.

The cap 12a may fit on a projecting part 26c on the upper end of the shaft 26, and be provided on an upper surface of the flange surrounding part 104. The cap 12a may cover the second gas-liquid interface 120 formed in the gap between the outer peripheral surface of the flange surrounding part 104 and the inner peripheral surface of the hub 28, in order to prevent the lubricant 92 from scattering into the disk accommodating space 24 from the second gas-liquid interface 120 and adhering onto the surface of the magnetic recording disks 8.

The narrower the gap between the cap 12a and the hub 28 in the radial direction, the smaller the amount of lubricant 92 scattering into the disk accommodating space 24, however, the higher the possibility of the cap 12a and the hub 28 making contact with each other. Accordingly, the gap between the cap 12a and the hub 28 may be appropriately set so that the amount of the lubricant 92 scattering into the disk accommodating space 24 can be reduced and the cap 12a and the hub 28 do not contact each other. The gap between the cap 12a and the hub 28 in the radial direction may be set in a range of 0.01 mm to 0.2 mm, for example.

The cap 12b may fit into an upper surface projecting part 28h of the hub 28, and be provided above the cap 12a in the axial direction. The cap 12b may cover the gap between the cap 12a and the hub 28, and prevent the lubricant 92 from reaching the disk accommodating space 24 from the second gas-liquid interface 120 via the gap between the cap 12a and the hub 28.

The narrower the gap between the cap 12a and the cap 12b in the axial direction, the smaller the amount of the lubricant 92 scattering into the disk accommodating space 24, however, the higher the possibility of the cap 12a and the cap 12b making contact with each other. Accordingly, the gap between the cap 12a and the cap 12b may be appropriately set so that the amount of the lubricant 92 scattering into the disk accommodating space 24 can be reduced and the cap 12a and the cap 12b do not contact each other. The gap between the cap 12a and the cap 12b in the axial direction may be set in a range of 0.01 mm to 0.2 mm, for example.

The cap 12a and the cap 12b may be formed by a resin material or a metal material such as SUS304, DHS1, copper alloy, and the like, for example. At least one of the caps 12a and 12b or a part of the caps 12a and 12b may be formed by a porous material such as a sintered metal, activated carbon including activated charcoal, and the like, for example. The porous material can capture the lubricant 92 that scatters into micro-pores thereof, and further reduce the amount of the lubricant 92 scattering into the disk accommodating space 24.

In addition, a gas dynamic pressure generating part 500 may be formed between the cap 12a and the hub 28, by forming a gas dynamic pressure generating groove 501 having a herringbone shape or a spiral shape, for example, in the lower surface of the cap 12a at a portion opposing the hub 28, as illustrated in FIG. 2. The gas dynamic pressure generating groove 501 may be formed to generate a dynamic pressure in the gas existing between the cap 12a and the hub 28, in a direction towards the inner periphery, when the hub 28 rotates. By forming this gas dynamic pressure generating part 500, the scattering of the lubricant 92 into the disk accommodating space 24 can further be reduced.

Similarly, a gas dynamic pressure generating groove having a herringbone shape or a spiral shape, for example, may be formed in one of or both the cap 12a and the cap 12b, at a part where the upper surface of the cap 12a and the lower surface of the cap 12b oppose each other along the axial direction. The gas dynamic pressure generating groove may form a gas dynamic pressure generating part 500 between the cap 12a and the cap 12b, as illustrated in FIG. 2. The gas dynamic pressure generating groove of this gas dynamic pressure generating part 500 may be formed to generate a dynamic pressure in the gas existing between the cap 12a and the cap 12b, in a direction towards the outer periphery, when the hub 28 rotates. By forming this gas dynamic pressure generating part 500, the scattering of the lubricant 92 into the disk accommodating space 24 can further be reduced.

As described above, according to the disk drive unit 100 in the first embodiment, the caps 12a and 12b provided in the overlapping manner so as to cover the second gas-liquid interface 120 can reduce the amount of the lubricant 92 scattering into the disk accommodating space 24. Further, by preventing the surface contamination of the magnetic recording disks 8 due to the scattering of the lubricant 92, the generation of the read error or the write error with respect to the magnetic recording disks 8 can be reduced in the disk drive unit 100, to thereby improve the reliability of the disk drive unit 100.

Second Embodiment

Next, a description will be given of a second embodiment. A description of those parts of the second embodiment that are the same as those corresponding parts of the embodiment described above will be omitted.

Figure 3:
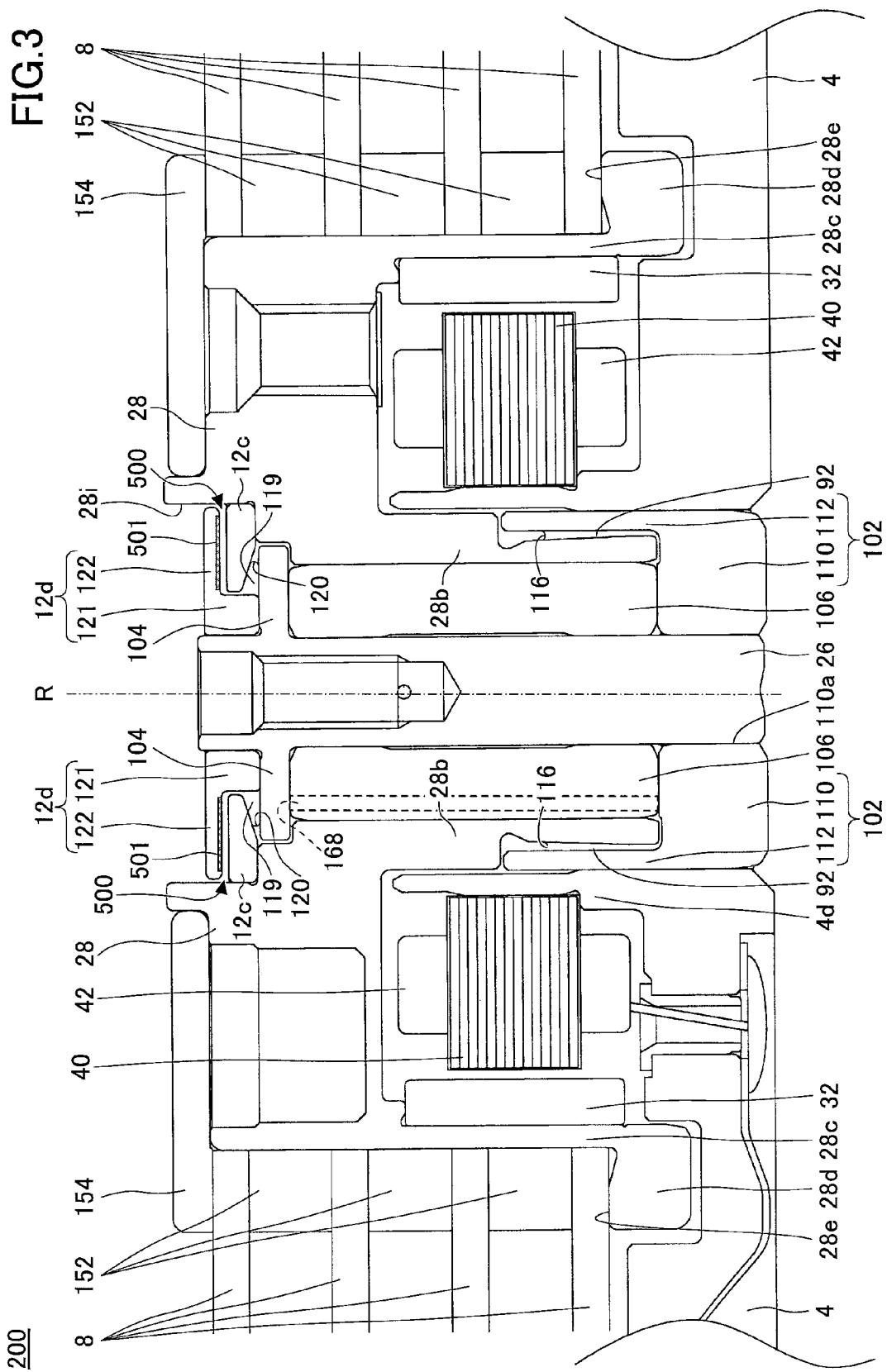
FIG. 3 is a cross sectional view illustrating the configuration of one part of the disk drive unit in a second embodiment.

FIG. 3 illustrates a cross sectional view of a disk drive unit 200 in the second embodiment, at a part similar to that of the cross section illustrated in FIG. 2.

The disk drive unit 200 may include a rotor that includes the hub 28, the cylindrical magnet 32, the sleeve 106, and the clamper 154. The disk drive unit 200 may include a fixed body that includes the base 4, the shaft 26, the laminated (or stacked) core 40, the coil 42, and the housing 102.

The four (4) stacked magnetic recording disks 8 having the ring-shaped spacer 152 interposed between each of two (2) mutually adjacent magnetic recording disks 8 are set on the disk setting surface 28e at the hub projecting part 28c of the hub 28. The magnetic recording disks 8 are fixed to the hub projecting part 28c together with the spacers 152, by being sandwiched between the clamper 154 and the disk setting part 28d, and rotate together with the hub 28.

The lubricant 92 is provided in the gap between the shaft 26 and the housing 102, and in the gap between the ring-shaped spacer 152 and the sleeve 106. The first gas-liquid interface 116 of the lubricant 92 may be formed between the cylindrical part 112 of the housing 102 and the sleeve surrounding part 28b of the hub 28. In addition, the second gas-liquid interface 120 of the lubricant 92 may be formed between a cap 12c which will be described later and the flange surrounding part 104 of the shaft 26.

(Cap)

In the disk drive unit 200, caps 12c and 12d formed by ring-shaped members that cover the gap between the hub 28 and the shaft 26 may be provided in a space extending from the second gas-liquid interface 120 of the lubricant 92 and connecting to the disk accommodating space 24 that accommodates the magnetic recording disks 8. The caps 12c and 12d formed by the ring-shaped members are provided in an overlapping manner along the direction of the rotational axis of the hub 28 and the sleeve 106.

The cap 12c may fit into a fitting hole 28i of the hub 28 and surround the upper end of the shaft 26, to cover the gap between the outer peripheral surface of the flange surrounding part 104 of the shaft 26 and the inner peripheral surface of the hub 28. In addition, the second gas-liquid interface 120 may be formed between a lower surface of the cap 12c and the upper surface of the flange surrounding part 104. The cap 12c may have a tapered shape that increases in size as the gap between the cap 12c and the flange surrounding part 104 in the axial direction becomes closer to the rotational axis, and form a tapered seal 119 with the flange surrounding part 104.

The cap 12d may include a shaft surrounding part 121 and a covering part 122. The cap 12d may fit on the upper end of the shaft 26, and be provided on the upper surface of the flange surrounding part 104. The shaft surrounding part 121 may surround the upper end of the shaft 26, and cover the cap between the cap 12c and the flange surrounding part 104. The covering part 122 may extend in the outer peripheral direction from the upper end of the shaft surrounding part 121, and be provided to cover the gap between the cap 12c and the shaft surrounding part 121. The cap 12d prevents the lubricant 92 from scattering into the disk accommodating space 24 from the second gas-liquid interface 120 and adhering onto the surface of the magnetic recording disks 8.

The narrower the gap between the cap 12c and the the shaft surrounding part 121 of the cap 12d in the radial direction, the smaller the amount of lubricant 92 scattering into the disk accommodating space 24, however, the higher the possibility of the cap 12c and the cap 12d making contact with each other. Accordingly, the gap between the cap 12c and the shaft surrounding part 121 of the cap 12d in the radial direction may be appropriately set so that the amount of the lubricant 92 scattering into the disk accommodating space 24 can be reduced and the cap 12c and the cap 12d do not contact each other. The gap between the cap 12c and the cap 12d in the radial direction may be set in a range of 0.01 mm to 0.2 mm, for example.

The narrower the gap between the cap 12c and the cap 12d in the axial direction, the smaller the amount of the lubricant 92 scattering into the disk accommodating space 24, however, the higher the possibility of the cap 12c and the cap 12d making contact with each other. Accordingly, the gap between the cap 12c and the cap 12d may be appropriately set so that the amount of the lubricant 92 scattering into the disk accommodating space 24 can be reduced and the cap 12c and the cap 12d do not contact each other. The gap between the cap 12c and the cap 12d in the axial direction may be set in a range of 0.01 mm to 0.2 mm, for example.

The cap 12a and the cap 12b may be formed by a resin material or a metal material such as SUS304, DHS1, copper alloy, and the like, for example. At least one of the caps 12c and 12d or a part of the caps 12c and 12d may be formed by a porous material such as a sintered metal, activated carbon including activated charcoal, and the like, for example. The porous material can capture the lubricant 92 that scatters into micro-pores thereof, and further reduce the amount of the lubricant 92 scattering into the disk accommodating space 24.

In addition, a gas dynamic pressure generating part 500 may be formed between the cap 12c and the cap 12d, as illustrated in FIG. 3, by forming a gas dynamic pressure generating groove 501 having a herringbone shape or a spiral shape, for example, in one of or both the upper surface of the cap 12c and the lower surface of the covering part 122 of the cap 12d (FIG. 3 illustrates an example in which the gas dynamic pressure generating groove 501 is formed in the lower surface of the covering part 122 of the cap 12d). The gas dynamic pressure generating groove 501 may be formed to generate a dynamic pressure in the gas existing between the cap 12c and the covering part 122 of the cap 12d, in a direction towards the inner periphery, when the hub 28 rotates. By forming this gas dynamic pressure generating part 500, the scattering of the lubricant 92 into the disk accommodating space 24 can further be reduced.

As described above, according to the disk drive unit 200 in the second embodiment, the caps 12c and 12d provided in the overlapping manner so as to cover the second gas-liquid interface 120 can reduce the amount of the lubricant 92 scattering into the disk accommodating space 24. Further, by preventing the surface contamination of the magnetic recording disks 8 due to the scattering of the lubricant 92, the generation of the read error or the write error with respect to the magnetic recording disks 8 can be reduced in the disk drive unit 200, to thereby improve the reliability of the disk drive unit 200.

Third Embodiment

Next, a description will be given of a third embodiment. A description of those parts of the third embodiment that are the same as those corresponding parts of the embodiments described above will be omitted.

Figure 4:
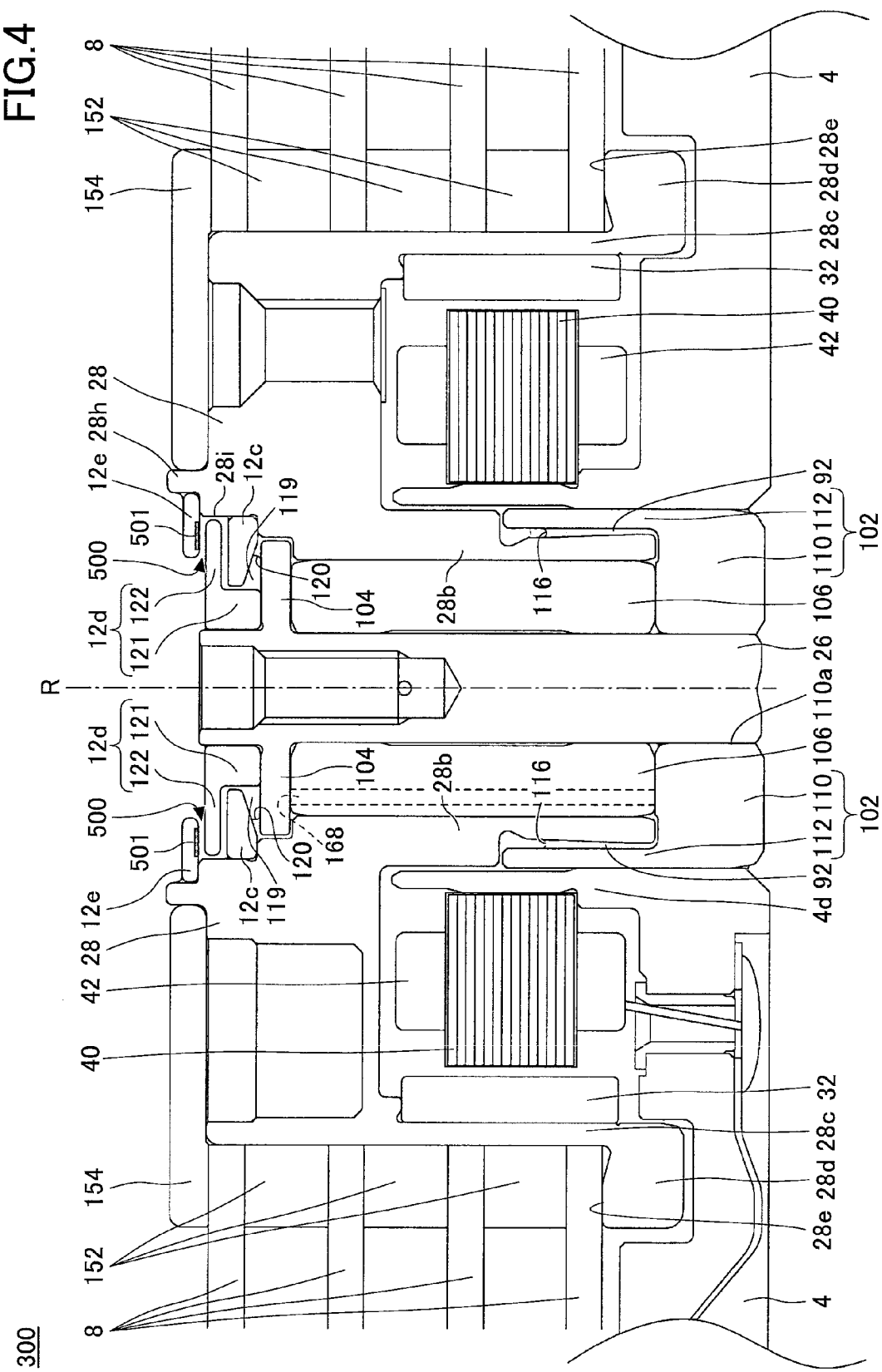
FIG. 4 is a cross sectional view illustrating the configuration of one part of the disk drive unit in a third embodiment.

FIG. 4 illustrates a cross sectional view of a disk drive unit 300 in the third embodiment, at a part similar to that of the cross section illustrated in FIG. 2.

The disk drive unit 300 may include a rotor that includes the hub 28, the cylindrical magnet 32, the sleeve 106, and the clamper 154. The disk drive unit 300 may include a fixed body that includes the base 4, the shaft 26, the laminated (or stacked) core 40, the coil 42, and the housing 102.

The four (4) stacked magnetic recording disks 8 having the ring-shaped spacer 152 interposed between each of two (2) mutually adjacent magnetic recording disks 8 are set on the disk setting surface 28e at the hub projecting part 28c of the hub 28. The magnetic recording disks 8 are fixed to the hub projecting part 28c together with the spacers 152, by being sandwiched between the clamper 154 and the disk setting part 28d, and rotate together with the hub 28.

The lubricant 92 is provided in the gap between the shaft 26 and the housing 102, and in the gap between the hub 28 and the sleeve 106. The first gas-liquid interface 116 of the lubricant 92 may be formed between the cylindrical part 112 of the housing 102 and the sleeve surrounding part 28b of the hub 28. In addition, the second gas-liquid interface 120 of the lubricant 92 may be formed between the cap 12c and the flange surrounding part 104 of the shaft 26.

(Cap)

In the disk drive unit 300, caps 12c, 12d, and 12e formed by ring-shaped members that cover the gap between the hub 28 and the shaft 26 may be provided in a space extending from the second gas-liquid interface 120 of the lubricant 92 and connecting to the disk accommodating space 24 that accommodates the magnetic recording disks 8. The caps 12c, 12d, and 12e formed by the ring-shaped members are provided in an overlapping manner along the direction of the rotational axis of the hub 28 and the sleeve 106.

The cap 12e may fit into an upper surface projecting part 28h of the hub 28 and surround the upper end of the shaft 26, to cover the gap between the covering part 122 of the cap 12d and the inner peripheral surface of the hub 28, in a manner overlapping the cap 12d in the axial direction. The cap 12e prevents the lubricant 92 from passing between the caps 12d and 12e and scattering into the disk accommodating space 24 from the second gas-liquid interface 120, and adhering onto the surface of the magnetic recording disks 8.

The narrower the gap between the covering part 122 of the cap 12d and the cap 12e in the axial direction, the smaller the amount of the lubricant 92 scattering into the disk accommodating space 24, however, the higher the possibility of the cap 12d and the cap 12e making contact with each other. Accordingly, the gap between the cap 12d and the cap 12e may be appropriately set so that the amount of the lubricant 92 scattering into the disk accommodating space 24 can be reduced and the cap 12d and the cap 12e do not contact each other. The gap between the cap 12d and the cap 12e in the axial direction may be set in a range of 0.01 mm to 0.2 mm, for example.

The cap 12e may be formed by a resin material or a metal material such as SUS304, DHS1, copper alloy, and the like, for example. At least a part of the cap 12e may be formed by a porous material such as a sintered metal, activated carbon including activated charcoal, and the like, for example. The porous material can capture the lubricant 92 that scatters into micro-pores thereof, and further reduce the amount of the lubricant 92 scattering into the disk accommodating space 24.

In addition, a gas dynamic pressure generating part 500 may be formed between the cap 12d and the cap 12e, as illustrated in FIG. 4, by forming a gas dynamic pressure generating groove 501 having a herringbone shape or a spiral shape, for example, in one of or both the upper surface of the covering part 122 of the cap 12d and the lower surface of the cap 12e (FIG. 4 illustrates an example in which the gas dynamic pressure generating groove 501 is formed in the lower surface of the cap 12e). The gas dynamic pressure generating groove 501 may be formed to generate a dynamic pressure in the gas existing between the covering part 122 of the cap 12d and the cap 12e, in a direction towards the inner periphery, when the hub 28 rotates. By forming this gas dynamic pressure generating part 500, the scattering of the lubricant 92 into the disk accommodating space 24 can further be reduced.

As described above, according to the disk drive unit 300 in the third embodiment, the caps 12c, 12d, and 12e provided in the overlapping manner so as to cover the second gas-liquid interface 120 can reduce the amount of the lubricant 92 scattering into the disk accommodating space 24. Further, by preventing the surface contamination of the magnetic recording disks 8 due to the scattering of the lubricant 92, the generation of the read error or the write error with respect to the magnetic recording disks 8 can be reduced in the disk drive unit 300, to thereby improve the reliability of the disk drive unit 300.

Fourth Embodiment

Next, a description will be given of a fourth embodiment. A description of those parts of the fourth embodiment that are the same as those corresponding parts of the embodiments described above will be omitted.

FIG. 5 illustrates a cross sectional view of a disk drive unit 400 in the fourth embodiment, at a part similar to that of the cross section illustrated in FIG. 2.

The disk drive unit 400 may include a rotor that is set with the magnetic recording disks 8 and rotates, a bearing unit that rotatably supports the rotor, and a fixed body that supports the bearing unit. The rotor may include the shaft 26, a flange 27, the hub 28, and the cylindrical magnet 32.

The fixed body may include the base 4, the laminated (or stacked) core 40, the coil 42, a plate 90, and the sleeve 106. The shaft 26 and the hub 28 rotate by being supported by the sleeve 106. The lubricant 92 is provided in the gap between the shaft 26 and the sleeve 106. In addition, a fluid dynamic pressure generating part that generates a fluid dynamic pressure in the lubricant 92, is provided between the shaft 26 and the sleeve 106, between the flange 27 and the sleeve 106, and between the flange 27 and the plate 90.

(Base)

The base 4 may include a center hole 4f to receive the sleeve 106 that is fixed to the base 4, and a cylindrical projecting part 4g that is provided to surround the center hole 4f. The base 4 may hold the sleeve 106 that is press fit, or bonded, or press fit and bonded into the center hole 4f, and the laminated core 40 may be fixed on the outer peripheral side of the projecting part 4g.

(Sleeve)

The sleeve 106 may be formed by a cylindrical member that surrounds the shaft 26. The sleeve 106 may be press fit, or bonded, or press fit and bonded to the inner peripheral surface of the base 4 forming the center hole 4f. The shaft 26 may be inserted into a shaft hole 106a of the sleeve 106. The plate 90 may be press fit, or bonded, or press fit and bonded to the lower end of the sleeve 106. The lubricant 92 may be provided in the gap between the sleeve 106 and the shaft 26.

(Hub)

The hub 28 may include a center hole 28j provided at a center portion thereof, a first cylindrical part 28k surrounding the center hole 28j, a second cylindrical part 28m provided on the outer peripheral side of the first cylindrical part 28k, and a disk setting part 28n on which the magnetic recording disk 8 is to be set, provided at the lower end on the outer peripheral side of the second cylindrical part 28m.

The cylindrical magnet 32 may be provided on an inner peripheral surface of the second cylindrical part 28m of the hub 28. The cylindrical magnet 32 may be fixed to a position opposing the laminated core 40 that is provided on the base 4.

The hub 28 may rotate integrally with the shaft 26 that is fixed to the center hole 28j, and rotate together with the magnetic recording disk 8 that is set on the disk setting part 28n.

(Shaft)

The upper end of the shaft 26 may be press fit, or bonded, or press fit and bonded within the center hole 28j of the hub 28, to be fixed to the hub 28. The flange 27 may be press fit and fixed to the lower end of the shaft 26. The lubricant 92 may be provided in the gaps between the sleeve 106 and the upper surface and the outer peripheral surface of the flange 27. The lubricant 92 may also be provided in the gap between the plate 90 and the lower surface of the flange 27 and the gap between the plate 90 and the lower surface of the shaft 26.

The shaft 26 rotates together with the hub 28 and the flange 27, by being supported by the sleeve 106, the plate 90, and the lubricant 92.

(Dynamic Pressure Generator)

The lubricant 92 may be provided in the gap between the shaft 26 and the sleeve 106. A first radial dynamic pressure generator 170 may be formed above the shaft 26, and a second radial dynamic pressure generator 172 may be formed under the shaft 26, at upper and lower positions that are separated along the axial direction.

The inner peripheral surface of the sleeve 106 may include a first radial dynamic pressure generating groove 70 having a herringbone shape or a spiral shape, for example, at a portion opposing the first radial dynamic pressure generator 170. In addition, the inner peripheral surface of the sleeve 106 may include a second radial dynamic pressure generating groove 72 having the herringbone shape of the spiral shape, for example, at a portion opposing the second radial dynamic pressure generator 172.

One of or both the first radial dynamic pressure generating groove 70 and the second radial dynamic pressure generating groove 72 may be formed on the outer peripheral surface of the shaft 26.

A first thrust dynamic pressure generator 174 may be provided between the lower surface of the sleeve 106 and the upper surface of the flange 27. One of the lower surface of the sleeve 106 and the upper surface of the flange 27 may include a first thrust dynamic pressure generating groove having a herringbone shape or a spiral shape, for example.

In addition, a second thrust dynamic pressure generator 176 may be provided between the lower surface of the flange 27 and the upper surface of the plate 90. One of the lower surface of the flange 27 and the upper surface of the plate 90 may include a second thrust dynamic pressure generating groove having a herringbone shape or a spiral shape, for example.

When the shaft 26, the flange 27, and the hub 28 rotate with respect to the sleeve 106, the dynamic pressure may be generated in the lubricant 92 at each of the first radial dynamic pressure generator 170, the second radial dynamic pressure generator 172, the first thrust dynamic pressure generator 174, and the second thrust dynamic pressure generator 176. The shaft 26, the flange 27, and the hub 28 may be supported in the radial direction and the direction of the rotational axis by the dynamic pressure generated in the lubricant 92, in a non-contact state in which no contact is made with the sleeve 106 and the plate 90.

(Gas-Liquid Interface)

A gas-liquid interface 123 of the lubricant 92 may be formed between the shaft 26 and the sleeve 106 at the upper end side of the sleeve 106. A tapered seal 117 may be provided in which the gap between the shaft 26 and the sleeve 106 gradually increases towards the upward direction. The lubricant 92 may be sealed by capillarity of the tapered seal 117 to prevent the lubricant 92 from leaking to the outside.

(Cap)

Caps $12f$ and $12g$ formed by ring-shaped members that cover the gap between the shaft 26 and the sleeve 106 may be provided in a space extending from the gas-liquid interface 123 of the lubricant 92 and connecting to the disk accommodating space 24 that accommodates the magnetic recording disks 8. The caps $12f$ and $12g$ formed by the ring-shaped members are provided in an overlapping manner along the direction of the rotational axis of the hub 28 and the sleeve 106.

The cap $12f$ may be fixed to the shaft 26 so as to cover the gap between the shaft 26 and the sleeve 106. The cap $12f$ may cover the gas-liquid interface 123 formed between the shaft 26 and the sleeve 106, in order to prevent the lubricant 92 from scattering into the disk accommodating space 24 from the gas-liquid interface 123 and adhering onto the surface of the magnetic recording disks 8.

The cap $12g$ may include a cylindrical part 124 that is fixed to the upper end surface of the sleeve 106 and extends upwardly, and a surrounding part 125 that extends from the upper end of the cylindrical part 124 towards the inner peripheral direction. The cylindrical part 124 may be fixed to the upper end of the sleeve 106, and be provided in a manner so as to cover the gap between the cap $12f$ and the sleeve 106. The surrounding part 125 may cover the gap between the cap $12f$ and the cylindrical part 124, and be provided in an overlapping manner to the cap $12f$ in the axial direction. The cap $12g$ may cover the gap between the cap $12f$ and the sleeve 106, and prevent the lubricant 92 from scattering into the disk accommodating space 24 from the gas-liquid interface 123.

The narrower the gap between the cap $12f$ and the the cylindrical part 124 of the cap $12g$ in the radial direction, the smaller the amount of lubricant 92 scattering into the disk accommodating space 24, however, the higher the possibility of the cap $12f$ and the cap $12g$ making contact with each other. Accordingly, the gap between the cap $12f$ and the cylindrical part 124 of the cap $12g$ may be appropriately set so that the amount of the lubricant 92 scattering into the disk accommodating space 24 can be reduced and the cap $12f$ and the cap $12g$ do not contact each other. The gap between the cap $12f$ and the cylindrical part 124 of the cap $12g$ in the radial direction may be set in a range of 0.01 mm to 0.2 mm, for example.

In addition, the narrower the gap between the cap $12f$ and the surrounding part 125 of the cap $12g$ in the axial direction, the smaller the amount of the lubricant 92 scattering into the disk accommodating space 24, however, the higher the possibility of the cap $12f$ and the cap $12g$ making contact with each other. Accordingly, the gap between the cap $12f$ and the surrounding part 125 of the cap $12g$ may be appropriately set so that the amount of the lubricant 92 scattering into the disk accommodating space 24 can be reduced and the cap $12f$ and the cap $12g$ do not contact each other.

The cap $12f$ and the cap $12g$ may be formed by a resin material or a metal material such as SUS304, DHS1, copper alloy, and the like, for example. At least one of the caps $12f$ and $12g$ or a part of the caps $12f$ and $12g$ may be formed by a porous material such as a sintered metal, activated carbon including activated charcoal, and the like, for example. The porous material can capture the lubricant 92 that scatters into micro-pores thereof, and further reduce the amount of the lubricant 92 scattering into the disk accommodating space 24.

Moreover, a gas dynamic pressure generating part 500 may be formed between the cap $12f$ and the sleeve 106, as illustrated in FIG. 5, by forming a gas dynamic pressure generating groove 501 having a herringbone shape or a spiral shape, for example, in one of or both the lower surface of the cap $12f$ and the upper surface of the sleeve 106 (FIG. 5 illustrates an example in which the gas dynamic pressure generating groove 501 is formed in the upper surface of the sleeve 106). The gas dynamic pressure generating groove 501 may be formed to generate a dynamic pressure in the gas existing between the cap $12f$ and the sleeve 106, in a direction towards the inner periphery, when the hub 28 rotates. By forming this gas dynamic pressure generating part 500, the scattering of the lubricant 92 into the disk accommodating space 24 can further be reduced.

Similarly, a gas dynamic pressure generating part 500 may be formed between the cap $12f$ and the cap $12g$, as illustrated in FIG. 5, by forming a gas dynamic pressure generating groove having a herringbone shape or a spiral shape, for example, in one of or both the upper surface of the cap $12f$ and the lower surface of the cap $12g$. This gas dynamic pressure generating groove forms the gas dynamic pressure generating part 500 between the cap $12f$ and the cap $12g$. The gas dynamic pressure generating groove of this gas dynamic pressure generating part 500 may be formed to generate a dynamic pressure in the gas existing between the cap $12f$ and the cap $12g$, in a direction towards the outer periphery, when the hub 28 rotates. By forming this gas dynamic pressure generating part 500, the scattering of the lubricant 92 into the disk accommodating space 24 can further be reduced.

Similarly, a gas dynamic pressure generating part 500 may be formed between the cap $12g$ and the hub 28, as illustrated in FIG. 5, by forming a gas dynamic pressure generating groove having a herringbone shape or a spiral shape, for example, in one of or both the upper surface of the cap $12g$ and the lower surface of the hub 28 opposing the cap 12g. This gas dynamic pressure generating groove forms the gas dynamic pressure generating part 500 between the cap 12g and the hub 28. The gas dynamic pressure generating groove of this gas dynamic pressure generating part 500 may be formed to generate a dynamic pressure in the gas existing between the cap 12g and the hub 28, in a direction towards the inner periphery, when the hub 28 rotates. By forming this gas dynamic pressure generating part 500, the scattering of the lubricant 92 into the disk accommodating space 24 can further be reduced.

As described above, according to the disk drive unit 400 in the fourth embodiment, the caps 12f and 12g provided in the overlapping manner so as to cover the gas-liquid interface 123 can reduce the amount of the lubricant 92 scattering into the disk accommodating space 24. Further, by preventing the surface contamination of the magnetic recording disks 8 due to the scattering of the lubricant 92, the generation of the read error or the write error with respect to the magnetic recording disks 8 can be reduced in the disk drive unit 400, to thereby improve the reliability of the disk drive unit 400.

According to each of the embodiments, it is possible to provide a disk drive unit that can prevent adhesion of the lubricant onto the disk surface, and reduce generation of the operation error.

Although the embodiments are numbered with, for example, "first," "second," or "third," or "fourth," the ordinal numbers do not imply priorities of the embodiments.

Although the embodiments of the present invention have been described in detail, it should be understood that the various changes, substitutions, and alterations could be made hereto without departing from the spirit and scope of the invention.

What is claimed is:

1. A disk drive unit comprising:
    a rotor, including a sleeve, and configured to rotate a disk accommodated within a disk accommodating space and set thereon;
    a fixed body, including a shaft body, and configured to rotatably support the rotor;
    a fluid dynamic pressure generating part provided between the fixed body and the rotor; and
    a plurality of ring-shaped members, provided in an overlapping manner along a direction of a rotational axis of the rotor within a space that communicates the disk accommodating space and a gas-liquid interface of the lubricant, and covering a gap between the rotor and the fixed body,
    wherein the gas-liquid interface of the lubricant is formed between the shaft body and the sleeve,
    wherein a tapered seal in which a gap between the shaft body and the sleeve gradually increases in a direction towards the plurality of ring-shaped members is provided in a part where the gas-liquid interface is formed, and
    wherein the tapered seal seals the lubricant by capillarity.

2. The disk drive unit as claimed in claim 1, wherein the plurality of ring-shaped members include
    a first ring-shaped member provided on the fixed body; and
    a second ring-shaped member, provided on the rotor in a space closer to the disk accommodating space than the first ring-shaped member, and covering a gap between the rotor and the first ring-shaped member.

3. The disk drive unit as claimed in claim 1, wherein the plurality of ring-shaped members include
    a first ring-shaped member provided on the rotor; and
    a second ring-shaped member, provided on the fixed body in a space closer to the disk accommodating space than the first ring-shaped member, and covering a gap between the fixed body and the first ring-shaped member.

4. The disk drive unit as claimed in claim 3, wherein the plurality of ring-shaped members further include
    a third ring-shaped member provided on the rotor and covering a gap between the rotor and the second ring-shaped member.

5. The disk drive unit as claimed in claim 3, wherein the gas-liquid interface makes contact with the first ring-shaped member.

6. The disk drive unit as claimed in claim 5, wherein the first ring-shaped member has a tapered shape such that a gap between the first ring-shaped member and the rotor along the direction of the rotational axis increases towards the rotational axis.

7. The disk drive unit as claimed in claim 1, wherein at least one of the plurality of ring-shaped members includes a part formed by a porous material.

8. The disk drive unit as claimed in claim 1, further comprising:
    a gas dynamic pressure generating part configured to generate a dynamic pressure in a gas existing on a surface of at least one of the plurality of ring-shaped members, in a direction towards the gas-liquid interface, when the rotor rotates.

9. The disk drive unit as claimed in claim 8, wherein the gas dynamic pressure generating part includes at least one gas dynamic pressure generating groove having a herringbone shape or a spiral shape provided in at least one of the plurality of ring-shaped members.

10. The disk drive unit as claimed in claim 1, wherein
    the lubricant is provided in a first gap between an outer peripheral surface of the shaft body and an inner peripheral surface of the sleeve,
    a first radial dynamic pressure generating part and a second radial dynamic pressure generating part, separated along the direction of the rotational axis, are formed in the first gap,
    the lubricant is provided in a second gap between a lower surface of the sleeve and an upper surface of a part of the fixed body supporting the shaft body,
    a first thrust dynamic pressure generator, configured to generate a dynamic pressure in the lubricant along the direction of the rotational axis when the rotor rotates, is formed in the second gap,
    the lubricant is provided in a third gap between an upper surface of the sleeve and a lower surface of a surrounding part of the shaft body,
    a second thrust dynamic pressure generator, configured to generate a dynamic pressure in the lubricant along the direction of the rotational axis when the rotor rotates, is formed in the third gap, and
    the first and second radial dynamic pressure generating parts and the first and second thrust dynamic pressure generators respectively generate dynamic pressures in the lubricant when the sleeve rotates with respect to the shaft body, in order to support the sleeve in a radial direction and in the direction of the rotational axis by the dynamic pressures generated in the lubricant in a state in which no contact is made between the sleeve and the shaft body.

11. The disk drive unit as claimed in claim 10, wherein
    the sleeve includes a bypass communication hole bypassing the first and second thrust dynamic pressure generators, and the bypass communication hole stabilizes a behavior of the lubricant by reducing pressure differences amongst regions in which the lubricant is provided.

12. A disk drive unit comprising:
a rotor configured to rotate a disk accommodated within a disk accommodating space and set thereon;
a fixed body configured to rotatably support the rotor;
a fluid dynamic pressure generating part provided between the fixed body and the rotor;
a tapered seal provided at a gas-liquid interface of a lubricant formed between the fixed body and the rotor, wherein a gap of the tapered seal between the fixed body and the rotor gradually increases in a first direction opposite to a second direction towards the fluid dynamic pressure generating part; and
a plurality of ring-shaped members, provided in an overlapping manner along a direction of a rotational axis of the rotor within a space that communicates the disk accommodating space and the gas-liquid interface of the lubricant, and covering a side of the tapered seal having the gap.

13. The disk drive unit as claimed in claim 12, wherein the plurality of ring-shaped members include
a first ring-shaped member provided on the fixed body; and
a second ring-shaped member provided on the rotor.

14. The disk drive unit as claimed in claim 13, wherein the second ring-shaped member is provided at a space closer to the disk accommodating space than the first ring-shaped member.

15. The disk drive unit as claimed in claim 14, wherein the plurality of ring-shaped members further include
a third ring-shaped member provided on the rotor and covering a gap between the rotor and the second ring-shaped member.

16. The disk drive unit as claimed in claim 13, wherein a gas-liquid interface of the lubricant makes contact with the first ring-shaped member.

17. The disk drive unit as claimed in claim 13, wherein at least one of the plurality of ring-shaped members includes a part formed by a porous material.

18. The disk drive unit as claimed in claim 12, wherein at least one of the plurality of ring-shaped members includes a gas dynamic pressure generating groove.

19. The disk drive unit as claimed in claim 12, wherein the fluid dynamic pressure generating part includes
a first radial dynamic pressure generating part and a second radial dynamic pressure generating part, formed in a first gap in which the rotor and the fixed body oppose each other in a radial direction, and separated along the direction of the rotational axis, and
a first thrust dynamic pressure generator and a second thrust dynamic pressure generator, provided in a second gap in which the rotor and the fixed body oppose each other in the direction of the rotational axis,
wherein the first and second radial dynamic pressure generating parts and the first and second thrust dynamic pressure generators respectively generate dynamic pressures in the lubricant when the rotor rotates with respect to the fixed body, in order to support the rotor in the radial direction and in the direction of the rotational axis by the dynamic pressures generated in the lubricant in a state in which no contact is made between the rotor and the fixed body.

20. The disk drive unit as claimed in claim 19, wherein
the rotor includes a bypass communication hole bypassing the first and second thrust dynamic pressure generators, and
the bypass communication hole stabilizes a behavior of the lubricant by reducing pressure differences amongst regions in which the lubricant is provided.

* * * * *